Figure 1:
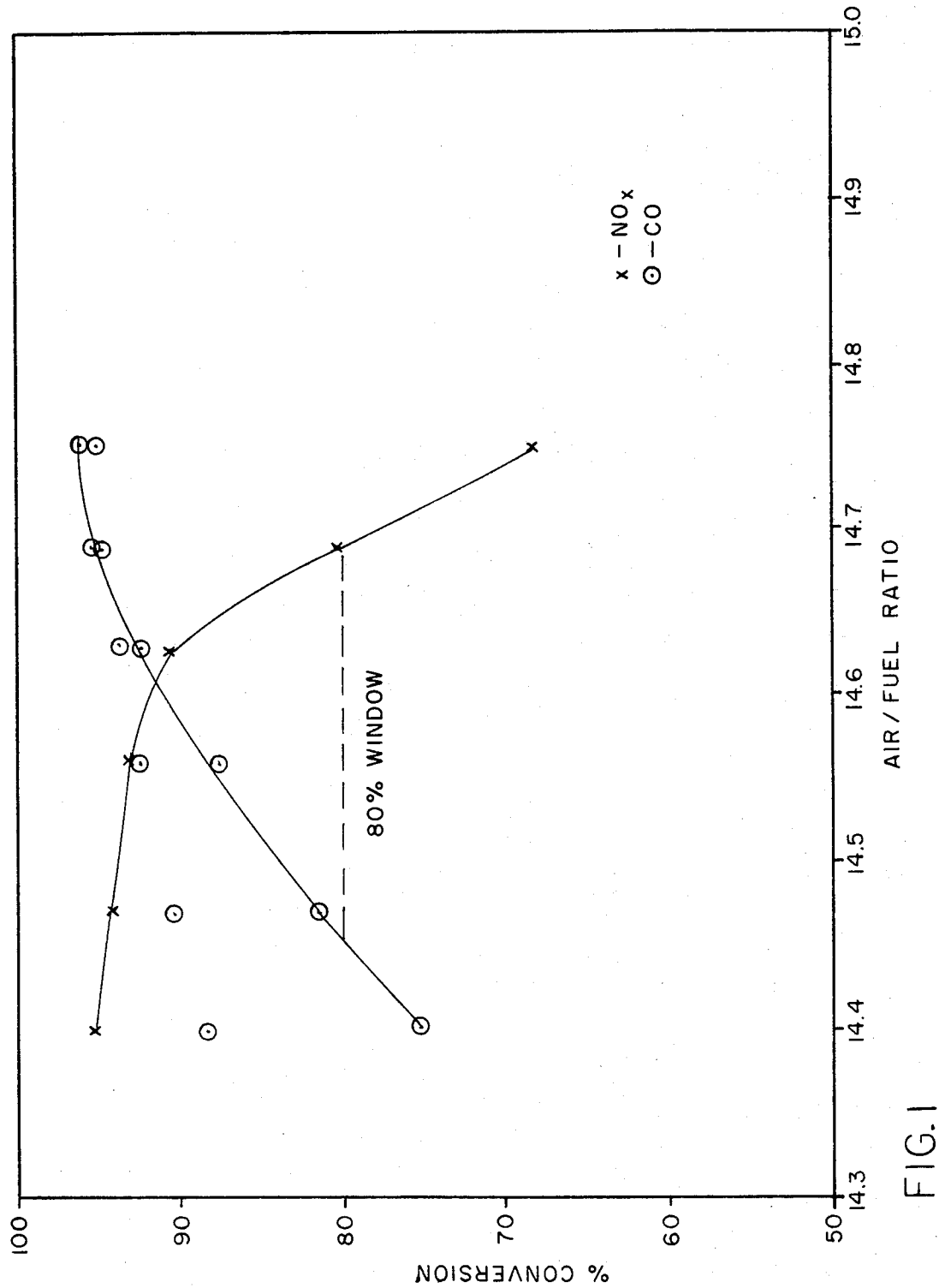

United States Patent [19]

Barber

[11] Patent Number: 4,497,783
[45] Date of Patent: Feb. 5, 1985

[54] EXHAUST EMISSION CATALYST
[75] Inventor: William A. Barber, Stamford, Conn.
[73] Assignee: American Cyanamid Company, Stamford, Conn.
[21] Appl. No.: 405,469
[22] Filed: Aug. 5, 1982

Related U.S. Application Data
[63] Continuation-in-part of Ser. No. 293,644, Aug. 17, 1981, abandoned.
[51] Int. Cl.³ .............................................. B01D 53/36
[52] U.S. Cl. .................................. 423/213.5; 502/330
[58] Field of Search .......................... 423/213.5, 213.7; 252/473, 474

[56] References Cited
U.S. PATENT DOCUMENTS
3,388,077  6/1968  Hoekstra .......................... 423/213.5
4,369,132  1/1983  Kinoshita et al. ................. 423/213.5

Primary Examiner—Earl C. Thomas
Assistant Examiner—Jeffrey E. Russel
Attorney, Agent, or Firm—Gordon L. Hart

[57] ABSTRACT

An improved catalyst for the conversion of exhaust emissions from internal combustion engines comprises platinum on a refractory support and sodium or potassium or a combination of sodium and potassium in an amount sufficient to significantly broaden the A/F window for said catalyst. In place of sodium or potassium, barium may be used, although it is less effective than sodium or potassium. A preferred catalyst composition comprises platinum, palladium and rhodium on a refractory support and sodium or potassium in an amount sufficient to significantly broaden the A/F window of said catalyst.

9 Claims, 3 Drawing Figures

EXHAUST EMISSION CATALYST

This is a continuation-in-part of application Ser. No. 293,644 filed Aug. 17, 1981, now abandoned.

The invention relates to improvements in catalyst compositions useful for catalytic conversion of exhaust emissions from internal combustion engines.

Catalysts comprising platinum on a refractory support are used to catalyze the oxidation of carbon monoxide and hydrocarbon components in engine exhausts. Palladium may be employed in combination with the platinum to improve the process. Rhodium may also be added to the platinum in the catalyst to obtain an additional conversion of $NO_x$ components by catalytic reduction. The efficiencies of the several oxidation and reduction reactions in the catalytic conversion of exhaust gas will be affected by the composition of the exhaust gas to be treated, which in turn relates to the air to fuel ratio (A/F) in the combustible mixture fed to the engine.

It has been observed that a catalytic converter will most efficiently catalyze the respective oxidation and reduction reactions simultaneously when the engine is operated at A/F near the stoichiometric mixture, usually about 14.6 parts by weight air per part of hydrocarbon fuel. When a leaner air-fuel mixture is fed to the engine, the catalytic converter will efficiently oxidize CO and hydrocarbon components in the exhaust but the efficiency of $NO_x$ conversion will fall off. On the other hand, the use of a richer air-fuel mixture (lower A/F) will adversely affect the oxidation reactions and favor the $NO_x$ conversion reactions to the converter.

In designing a catalyst for use in conversion of exhaust emissions a goal is to broaden the range of air to fuel ratios (A/F) within which suitably high conversions can be maintained in both the reactions for oxidation of hydrocarbon and carbon monoxide components and the reactions for reduction of $NO_x$ components in a catalytic conversion reactor.

It is known that cerium and iron additives in the platinum-rhodium catalysts can in some cases improve the catalytic performance, particularly with regard to broadening the range of air to fuel ratios (A/F) within which the engine can be operated while maintaining a suitable catalyst efficiency for both the oxidation and reduction reactions. This range of permissible air to fuel ratios for any given oxidation-reduction catalyst may be designated as the A/F "window" for that catalyst.

According to the present invention, an improved exhaust emission catalyst is provided comprising platinum, with or without palladium and with or without rhodium for the simultaneous conversion of hydrocarbon, carbon monoxide and $NO_x$ components in engine exhaust emissions, and further comprising sodium or potassium or a combination of sodium and potassium, present in an amount sufficient to significantly improved the A/F window for the catalyst.

Barium may be used in place of sodium or potassium, but has been found to be less effective as an A/F window improver.

In the use of a platinum catalyst, by which term I mean platinum, as the sole noble metal, a combination of platinum and rhodium, a combination of platinum and palladium or a combination of platinum, palladium and rhodium, on a refractory support without improvers, the A/F window is extremely narrow. With known improvers, i.e cerium and iron, some broadening of the window can be obtained, and significant improvement is obtained when both cerium and iron are used in combination. I have found that sodium or potassium or a combination of sodium and potassium when used as the sole improver in a platinum catalyst will provide significant broadening of the A/F window. The sodium and/or potassium may also be used in combination with another improver, such as cerium and/or iron.

Sodium or potassium may be added to the platinum catalyst by any suitable method, employing known impregnation methods. For example, the catalyst support is impregnated with an aqueous solution of a sodium or potassium salt, e.g. nitrate, or the like, using an amount of solution calculated to have the desired amount of the salt on the catalyst support surface. After impregnation, the catalyst may then be dried in air at an elevated temperature. The sodium and potassium may be applied in the support separately or may be applied in combination with some or all of the other metal components of the catalyst.

When platinum, with or without palladium, is used in combination with rhodium, as the noble metals in the catalyst, an effective method for employing the sodium or potassium comprises a separate impregnation step for applying the platinum or the platinum and the palladium, and a separate step for applying the rhodium, the sodium or potassium being employed, with or without other improvers, in the same solution as the platinum.

My invention encompasses a catalyst for emission control comprising a platinum catalyst, i.e. platinum, platinum and palladium, platinum and rhodium or platinum, palladium and rhodium, in combination with sodium and/or potassium, with or without other enhancers, such as cerium and/or iron. The noble metals, i.e. platinum and the palladium, if employed, and the rhodium, if employed, and the sodium or potassium are employed in proportions effective for this invention, for example, in the proportions set forth in the examples, which examples are, however, merely illustrative. The catalyst support and noble metals may generally be employed in amounts and ratios well known in the art. The invention contemplates the use of any amount of sodium and/or potassium which will be effective, when present in the catalyst to improve the A/F window of the catalyst. For example, when the support and the noble metals are employed in the amount set forth in the examples, the sodium or the potassium may be present in the final catalyst in the amounts shown in the examples or may be present in amounts varying from about 4 grams of the metal per liter of catalyst to about 24 grams per liter.

While barium is less preferred than sodium or potassium, I have found that barium does function as an A/F window improver. Barium may be employed as shown in the examples or in an amount based on the indicated support and noble metal amounts of from about 8 grams per liter to about 24 grams per liter.

Any suitable refractory catalyst support may be employed. For example, the catalyst may be supported on alumina particles or on alumina surfaces of monolithic supports or the like.

The methods set forth in the examples may be used to prepare the catalysts of this invention as well as the general methods known in the art for this general type of catalyst or whatever method is effective may be employed.

In the examples which follow are described detailed descriptions of my presently most preferred embodiments, together with less preferred embodiments and comparative examples. A discussion of the examples is set forth later in this specification.

The following examples are illustrative:

EXAMPLE 1

A catalyst was prepared using, as a base, a cylindrical, extruded, washed and calcined alumina base having a bulk density of 31 pounds per cubic foot. To this base, which was employed in an amount constituting 150 parts by weight, was added by pore volume impregnation a water solution containing 17.5 parts of iron nitrate nonahydrate, 7.5 parts of cerium nitrate hexahydrate, 0.172 parts of platinum in a solution in which chloride was essentially absent, and 0.069 parts of palladium as palladium nitrate. After impregnation, this catalyst was dried and reduced for one hour under a stream of nitrogen gas containing 5 percent hydrogen at a temperature of 300° C. The resulting partly formed catalyst was then pore volume impregnated with a water solution of 0.022 parts of rhodium, as rhodium chloride, and subsequently dried at a temperature of 150° C. The resulting catalyst contained, per liter of catalyst, 8 grams of iron, 8 grams of cerium, 0.569 grams of platinum, 0.228 grams of palladium and 0.0714 grams of rhodium.

EXAMPLE 2

A catalyst was prepared in the same manner as set forth in Example 1 above, except that 8.9 parts by weight of sodium nitrate was employed in place of the 17.5 parts by weight of iron nitrate nonahydrate. The final catalyst composition contained per liter of catalyst, 8 grams of sodium, 8 grams of cerium, 0.569 grams of platinum, 0.228 grams of palladium and 0.0714 grams of rhodium.

EXAMPLE 3

A catalyst was prepared in the same manner as set forth in Example 1 above, except that 6.2 parts by weight of potassium nitrate was employed in place of the 17.5 parts by weight of iron nitrate nonahydrate. The final catalyst composition contained, per liter of catalyst, 8 grams of potassium, 8 grams of cerium, 0.569 grams of platinum, 0.228 grams of palladium and 0.0714 grams of rhodium.

EXAMPLE 4

A catalyst was prepared in the same manner as set forth in Example 1 above, except that 8.9 parts by weight of sodium nitrate was employed in place of the 17.5 parts by weight of iron nitrate nonahydrate and the 7.5 parts of weight of cerium nitrate hexahydrate. The final catalyst composition contained, per liter of catalyst, 8 grams of sodium, 0.569 grams of platinum, 0.228 grams of palladium and 0.0714 grams of rhodium.

EXAMPLE 5

A catalyst was prepared in the same manner as set forth in Example 1 above, except that 6.25 parts by weight of potassium nitrate was employed in place of the 17.5 parts by weight of iron nitrate nonahydrate and the 7.5 parts by weight of cerium nitrate hexahydrate. The final catalyst composition contained, per liter of catalyst, 8 grams of potassium, 0.569 grams of platinum, 0.228 grams of palladium and 0.0714 grams of rhodium.

EXAMPLE 6

A catalyst was prepared using, as a base, a cylindrical, extruded, washed and calcined alumina base having a bulk density of 31 pounds per cubic foot. To this base, which was employed in an amount constituting 150 parts by weight, was added by pore volume impregnation a water solution containing 7.5 parts of cerium nitrate hexahydrate, 0.172 parts of platinum and 0.069 parts of palladium in a solution in which chloride was essentially absent. After impregnation, this catalyst was dried and reduced for one hour under a stream of nitrogen gas containing 5 percent hydrogen at a temperature of 300° C. The resulting partly formed catalyst was then pore volume impregnated with a water solution of 0.022 parts of rhodium, as rhodium chloride, and subsequently dried at a temperature of 150° C. The resulting catalyst contained, per liter of catalyst, 8 grams of cerium, 0.569 grams of platinum, 0.228 grams of palladium and 0.0714 grams of rhodium.

EXAMPLE 7

A catalyst was prepared using, as a base, a cylindrical, extruded, washed and calcined alumina base having a bulk density of 31 pounds per cubic foot. To this base, which was employed in an amount constituting 150 parts by weight, was added by pore volume impregnation a water solution containing 17.5 parts of iron nitrate nonahydrate, 7.5 parts of cerium nitrate hexahydrate, 8.9 parts of sodium nitrate, 0.172 parts of platinum and 0.069 parts of palladium in a solution in which chloride was essentially absent. After impregnation, this catalyst was dried and reduced for one hour under a stream of nitrogen gas containing 5 percent hydrogen at a temperature of 300° C. The resulting partly formed catalyst was then pore volume impregnated with a water solution of 0.022 parts of rhodium, as rhodium chloride, and subsequently dried at a temperature of 150° C. The resulting catalyst contained, per liter of catalyst, 8 grams of iron, 8 grams of cerium, 8 grams of sodium, 0.569 grams of platinum, 0.228 grams of palladium and 0.0714 grams of rhodium.

EXAMPLE 8

A catalyst was prepared using, as a base, a cylindrical, extruded, washed and calcined alumina base having a bulk density of 31 pounds per cubic foot. To this base, which was employed in an amount constituting 150 parts by weight, was added by pore volume impregnation a water solution containing 17.5 parts of iron nitrate nonahydrate, 7.5 parts of cerium nitrate hexahydrate, 6.25 parts by weight of potassium nitrate, 0.172 parts of platinum and 0.069 parts of palladium in a solution in which chloride was essentially absent. After impregnation, this catalyst was dried and reduced for one hour under a stream of nitrogen gas containing 5 percent hydrogen at a temperature of 300° C. The resulting partly formed catalyst was then pore volume impregnated with a water solution of 0.022 parts of rhodium, as rhodium chloride, and subsequently dried at a temperature of 150° C. The resulting catalyst contained, per liter of catalyst, 8 grams of iron, 8 grams of cerium, 8 grams of potassium, 0.569 grams of platinum, 0.228 grams of palladium and 0.0714 grams of rhodium.

EXAMPLE 9

A catalyst was prepared using, as a base, a cylindrical, extruded, washed and calcined alumina base having a bulk density of 31 pounds per cubic foot. To this base, which was employed in an amount constituting 150 parts by weight, was added by pore volume impregnation a water solution containing 0.172 parts of platinum in a solution in which chloride was essentially absent. After impregnation, this catalyst was dried and reduced for one hour under a stream of nitrogen gas containing 5 percent hydrogen at a temperature of 300° C. The resulting catalyst contained, per liter of catalyst, 0.569 grams of platinum.

EXAMPLE 10

A catalyst was prepared using, as a base, a cylindrical, extruded, washed and calcined alumina base having a bulk density of 31 pounds per cubic foot. To this base, which was employed in an amount constituting 150 parts by weight, was added by pore volume impregnation a water solution containing 0.069 parts of palladium in a solution in which chloride was essentially absent. After impregnation, this catalyst was dried and reduced for one hour under a stream of nitrogen gas containing 5 percent hydrogen at a temperature of 300° C. The resulting catalyst contained, per liter of catalyst, 0.228 grams of palladium.

EXAMPLE 11

A catalyst was prepared using, as a base, a cylindrical, extruded, washed and calcined alumina base having a bulk density of 31 pounds per cubic foot. To this base, which was employed in an amount constituting 150 parts by weight, was added by pore volume impregnation a water solution containing 0.022 parts of rhodium in a solution in which chloride was essentially absent. After impregnation, this catalyst was dried and reduced for one hour under a stream of nitrogen gas containing 5 percent hydrogen at a temperature of 300° C. The resulting catalyst contained, per liter of catalyst, 0.0714 grams of rhodium.

EXAMPLE 12

A catalyst was prepared as in Example 9. However, in addition to 0.172 parts of platinum, 0.069 parts of palladium were also added, the resulting catalyst containing 0.569 grams of platinum and 0.228 grams of palladium per liter of catalyst.

EXAMPLE 13

A catalyst was prepared as in Example 9 and was then pore volume impregnated with a water solution of 0.022 parts of rhodium, as rhodium chloride and the resulting material was dried at a temperature of 150° C. to provide a catalyst containing 0.569 grams of platinum and 0.0714 grams of rhodium per liter of catalyst.

EXAMPLE 14

A catalyst was prepared as in Example 10 and was then pore volume impregnated with a water solution of 0.022 parts of rhodium, as rhodium chloride and the resulting material was dried at a temperature of 150° C. to provide a catalyst containing 0.228 grams of palladium and 0.0714 grams of rhodium per liter of catalyst.

EXAMPLE 15

A catalyst was prepared using, as a base, a cylindrical, extruded, washed and calcined alumina base having a bulk density of 31 pounds per cubic foot. To this base, which was employed in an amount constititing 150 parts by weight, was added by pore volume impregnation a water solution containing 0.172 parts of platinum and 0.069 parts of palladium in a solution in which chloride was essentially absent. After impregnation, this catalyst was dried and reduced for one hour under a stream of nitrogen gas containing 5 percent hydrogen at a temperature of 300° C. The resulting partly formed catalyst was then pore volume impregnated with a water solution of 0.022 parts of rhodium, as rhodium chloride and subsequently dried at a temperature of 150° C. The resulting catalyst contained, by volume, 0.569 grams of platinum, 0.228 grams of palladium and 0.0714 grams of rhodium per liter of catalyst.

EXAMPLE 16

A catalyst was prepared as in Example 9, except that 8.9 parts of sodium nitrate were added to the impregnating solution to provide a catalyst containing 8 grams of sodium and 0.569 grams of platinum per liter of catalyst.

EXAMPLE 17

A catalyst was prepared as in Example 10, except that 8.9 parts of sodium nitrate was added to the impregnating solution to provide a catalyst containing 8 grams of sodium and 0.228 grams of palladium per liter of catalyst.

EXAMPLE 18

A catalyst was prepared as in Example 11, except that 8.9 parts of sodium nitrate were used in the impregnating solution along with the rhodium to provide a catalyst containing 8 grams of sodium and 0.0714 grams of rhodium per liter of catalyst.

EXAMPLE 19

A catalyst was prepared as in Example 12, except that 8.9 parts of sodium nitrate were added in the impregnating solution along with the platinum and palladium to provide a catalyst containing 8 grams of sodium, 0.569 grams of platinum and 0.228 grams of palladium per liter of catalyst.

EXAMPLE 20

A catalyst was prepared as in Example 13, except that 8.9 parts of sodium nitrate were used in the impregnation with the platinum to provide a catalyst containing 8 grams of sodium, 0.569 grams of platinum and 0.0714 grams of rhodium per liter of catalyst.

EXAMPLE 21

A catalyst was prepared as in Example 14, except that 8.9 parts of sodium nitrate were used in the impregnation solution along with the palladium to provide a catalyst containing 8 grams of sodium, 0.228 grams of palladium and 0.0714 grams of rhodium per liter of catalyst.

EXAMPLE 22

A catalyst was prepared as in Example 16, except that 5.0 parts of barium nitrate were employed in place of the sodium nitrate to provide a catalyst containing 8 grams of barium and 0.569 grams of platinum per liter of catalyst.

EXAMPLE 23

A catalyst was prepared as in Example 17, except that 5.0 parts of barium nitrate were employed instead of sodium nitrate to provide a catalyst containing 8 grams of barium and 0.228 grams of palladium per liter of catalyst.

EXAMPLE 24

A catalyst was prepared as in Example 18, except that 5.0 parts of barium nitrate were employed instead of sodium nitrate to provide a catalyst containing 8 grams of barium and 0.0714 grams of rhodium per liter of catalyst.

EXAMPLE 25

A catalyst was prepared as in Example 19, except that 5.0 parts of barium nitrate were employed instead of sodium nitrate to provide a catalyst containing 8 grams of barium, 0.569 grams of platinum and 0.228 grams of palladium per liter of catalyst.

EXAMPLE 26

A catalyst was prepared as in Example 13, except that 5.0 parts of barium nitrate were employed in the impregnation with the platinum to provide a catalyst containing 8 grams of barium, 0.569 grams of platinum and 0.0714 grams of rhodium per liter of catalyst.

EXAMPLE 27

A catalyst was prepared as in Example 14, except that 5.0 parts of barium nitrate were employed in the impregnation with palladium to provide a catalyst containing 8 grams of barium, 0.228 grams of palladium and 0.0714 grams of rhodium per liter of catalyst.

EXAMPLE 28

A catalyst was prepared as in Example 15, except that 5.0 parts of barium nitrate were employed in the impregnation with the platinum and palladium to provide a catalyst containing 8 grams of barium, 0.569 grams of platinum, 0.228 grams of palladium and 0.0714 grams of rhodium per liter of catalyst.

Of the preceding examples, Examples 1, 6, 9, 10, 11, 12, 13, 14 and 15 are not illustrative of the present invention. Examples 11–15 are representative of catalysts containing no A/F window improver. Examples 2, 3, 4, 5, 7, 8, 16, 17, 18, 19, 20 and 21 are illustrative of the use of sodium and/or potassium in accordance with the present invention.

Examples 22, 23, 24, 25, 26, 27 and 28 are illustrative of the use of barium which I have also found to be an A/F window improver. The barium may approach cerium in effectiveness, but has not been found to be as effective as sodium or potassium.

To test the catalysts in the laboratory, several gases are mixed to make simulated automobile engine exhaust gas compositions. The simulated mixtures consist of hydrogen, carbon dioxide, propylene, nitric oxide, nitrogen, oxygen, carbon monoxide and water vapor, mixed in proportions to simulate auto exhaust produced at several air to fuel ratios (A/F) as calculated by the method described by L. Eltinge in SAE Report No. 680114. The proportions of $O_2$, CO, $H_2$ and $C_3H_6$ in a mixture fed continuously to a catalyst test reactor during a given run, are varied to simulate cyclic changes in A/F through a range of about 0.75 A/F unit at a frequency of about ½ Hz, in an approximate sawtooth pattern. We use the term AF unit to describe a difference of one in AF values, e.g. The difference between AF 14 and AF 15 is one AF unit. The simulated exhaust gas mixture is preheated to 800° F. and fed continuously at that temperature to the inlet of a reactor containing the test catalyst. The hourly space velocity is about 100,000. Samples of the gas entering, and of that leaving the reactor are collected and analyzed in a manner to obtain time-averaged inlet and outlet gas compositions, from which percent conversions of several exhaust components are calculated. This test procedure is followed in several runs, using the same catalyst while changing the time-averaged feed compositions from run to run to obtain percent conversions at several time-averaged feed compositions which will correspond to several averaged A/F values in the range from A/F 14.2 to A/F 14.9.

The percent conversions calculated for all of the mixtures used to test a given catalyst are plotted on a single graph to produce two curves showing, respectively, percent conversion versus average A/F for carbon monoxide, and the same for the $NO_x$ components, in the range of average A/F values of the feed mixtures used. The A/F range for the simulated gas mixtures used in the test is selected so that the respective CO and $NO_x$ curves on the plot will cross each other within the selected test range, and so that the 80 percent conversion points, for each of CO and $NO_x$ will appear on curves plotted from the test results.

Significant results for a catalyst tested are the percent conversion at the point on the plot where the CO and $NO_x$ curves cross (crossover %) and the width on the plot in A/F units between the 80 percent conversion points on the respective CO and $NO_x$ curves (80% window).

The catalysts prepared in Examples 1 through 28, above, were evaluated by the above-described test. The advantage of the present invention can be appreciated most readily by comparison of A/F windows observed upon testing the several catalysts as described above.

Figure 2:
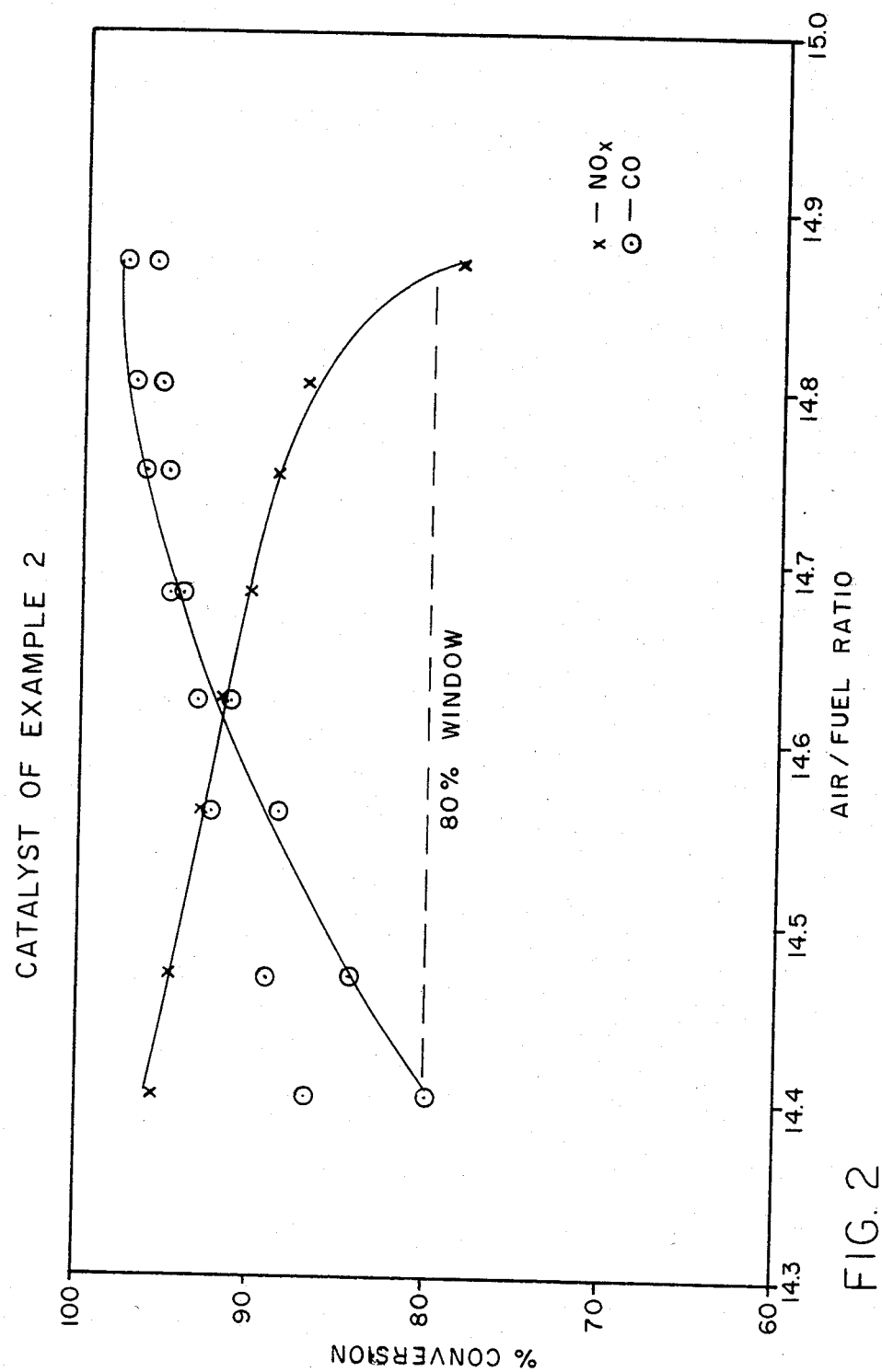
Figure 3:
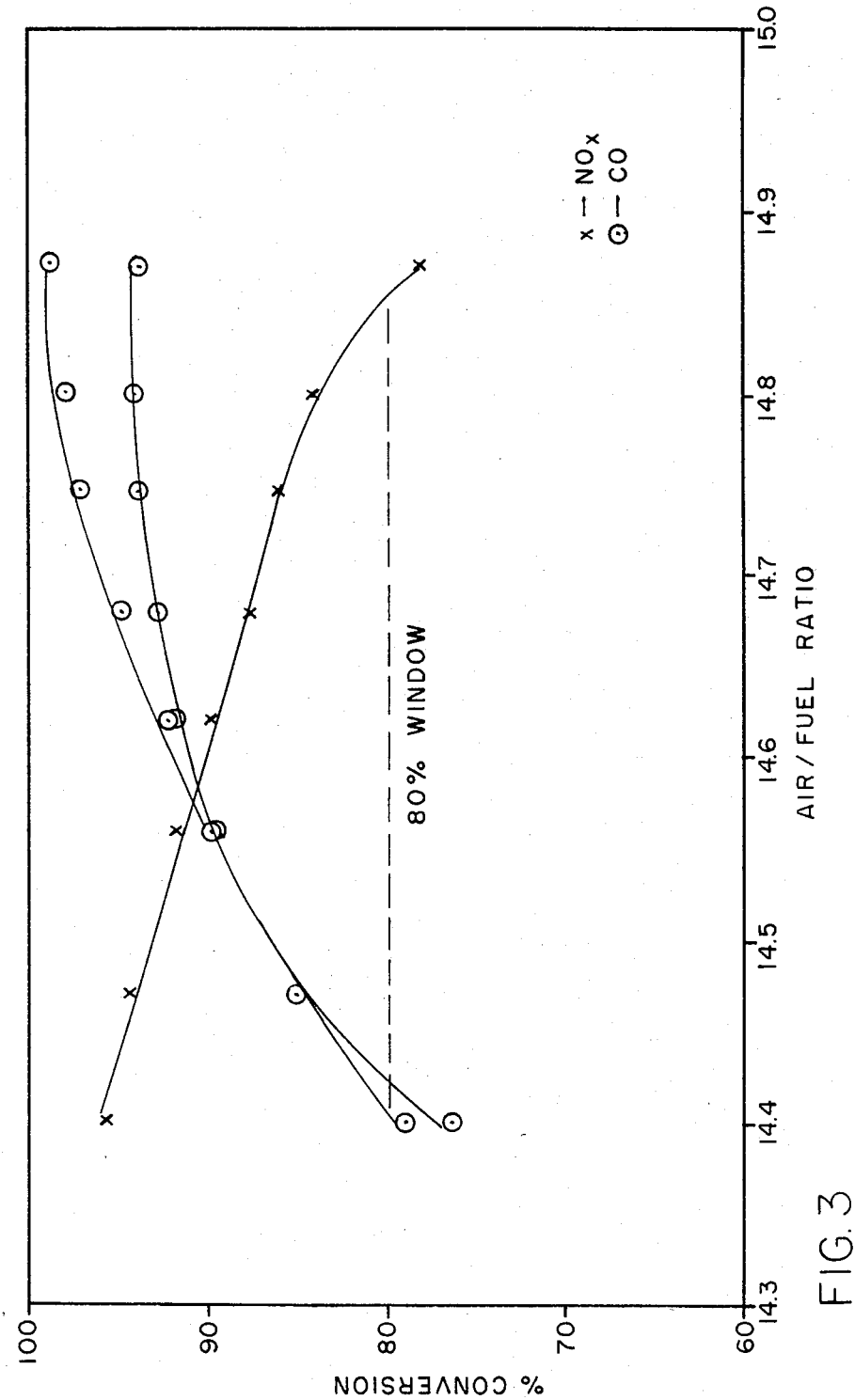

Reference is made to the drawing wherein FIG. 1 is a graphic plot of the test results obtained using the catalyst described in Example 1 (which is not illustrative of this invention) and FIGS. 2 and 3 are plots of the test results using the catalysts of Examples 2 and 7, respectively, which are illustrative of the present invention. The width of the A/F window is expressed in A/F units as the difference between the A/F at which 80 percent conversion of CO was obtained and that at which 80 percent conversion of $NO_x$ was obtained. The drawing also shows the CO/$NO_x$ crossover point of the two curves.

Each catalyst described in the Examples was tested as described and a curve of the kind shown in the drawing was plotted for each catalyst tested. In Table I the values of the crossover percentage, expressed as percent conversion of CO and $NO_x$, the percent conversion of hydrocarbon, the net conversion of $NO_x$ (Net $NO_x$ = $NO_x$ converted – $NH_3$ formed) and the 80% window expressed in A/F units, are tabulated for each of the catalysts described in the Examples.

TABLE I

| Example | % Conversion at CO—$NO_x$ Crossover | HC | Net $NO_x$ | A/F Window at 80% Conversion of CO and $NO_x$, in A/F Units |
|---|---|---|---|---|
| 1 | 92 | 94 | 75 | .25 |
| 2 | 92 | 94 | 72 | .46 |
| 3 | 92 | 86 | 76 | .52 |
| 4 | 92 | 91 | 75 | .46 |
| 5 | 92 | 89 | 76 | .35 |
| 6 | 86 | 92 | 66 | .16 |
| 7 | 92 | 91 | 68 | .44 |

TABLE I-continued

| Example | % Conversion at CO—NO$_x$ Crossover | HC | Net NO$_x$ | A/F Window at 80% Conversion of CO and NO$_x$, in A/F Units |
|---|---|---|---|---|
| 8 | 94 | 88 | 72 | .48 |
| 9 | 76 | 85 | 62 | — |
| 10 | 55 | 91 | 44 | — |
| 11 | 56 | 93 | 44 | — |
| 12 | 73 | 92 | 56 | — |
| 13 | 78 | 93 | 64 | — |
| 14 | 64 | 92 | 50 | — |
| 15 | 75 | 93 | 66 | — |
| 16 | 91 | 82 | 69 | .44 |
| 17 | 78 | 90 | 59 | — |
| 18 | 69 | 65 | 50 | — |
| 19 | 93 | 86 | 74 | .56 |
| 20 | 91 | 91 | 76 | .49 |
| 21 | 85 | 92 | 70 | .16 |
| 22 | 86 | 88 | 62 | .10 |
| 23 | 60 | 92 | 36 | — |
| 24 | 68 | 92 | 40 | — |
| 25 | 80 | 88 | 55 | — |
| 26 | 83 | 91 | 62 | .07 |
| 27 | 70 | 95 | 41 | — |
| 28 | 85 | 95 | 64 | .11 |

From FIGS. 1, 2 and 3 and from the data tabulated in Table I, it will be seen that the use of sodium and/or potassium provides significant and unexpected improvements in the % conversion A/F window obtained employing a platinum-containing catalyst, whether the platinum is employed alone or with palladium and/or rhodium. The sodium or potassium is effective when used as the sole improver and is also effective when used in combination with the known cerium and/or iron A/F window improvers.

It will be seen from Examples 1, 2 and 3 that when sodium or potassium is used instead of iron in a platinum, palladium, rhodium catalyst containing cerium as an improver, the A/F window is dramatically enlarged over the known combination of iron and cerium. Examples 4 and 5 demonstrate that sodium and potassium, respectively, are very effective A/F window improvers. Furthermore, as can be seen from Examples 7 and 8, sodium and potassium, respectively, when used in combination with iron and cerium as improvers, provide unexpected and superior results over the iron and cerium.

From examples 16, 22 and 9, respectively, it will be seen that sodium and to a lesser degree, barium improve the window over platinum alone.

From Examples 20, 26 and 13, respectively, it will be seen that sodium and, to a much lesser degree, barium improve the window over the combination of platinum and rhodium.

From Examples 28 and 15, it will be seen that a platinum, palladium, rhodium catalyst is improved by barium.

I claim:

1. In a process of catalytic conversion of internal combustion engine exhaust, including catalytic oxidation of CO and hydrocarbon components and catalytic reduction of NO$_x$ components in said emissions, wherein the catalyst comprises platinum with or without palladium and with or without rhodium on a refractory support in amounts effective for the defined oxidation and reduction, the improvement wherein the AF window for said catalyst is broadened by at least 0.25 AF unit by presence in said catalyst of at least one member selected from the group consisting of sodium and potassium.

2. A process defined by claim 1, wherein the platinum is present in combination with sodium.

3. A process defined in claim 1, wherein the platinum is present in combination with potassium.

4. A process defined by claim 1, wherein the platinum is present in combination with palladium and sodium.

5. A process defined by claim 1, wherein the platinum is present in combination with palladium and potassium.

6. A process defined by claim 1, wherein the platinum is present in combination with rhodium and sodium.

7. A process defined by claim 1, wherein the platinum is present in combination with rhodium and potassium.

8. A process defined by claim 1, wherein the platinum is present in combination with palladium, rhodium and sodium.

9. A process defined by claim 1, wherein the platinum is present in combination with palladium, rhodium and potassium.

* * * * *